United States Patent
Layson

[11] Patent Number: 5,906,067
[45] Date of Patent: May 25, 1999

[54] FISH DECOY

[76] Inventor: Alfred M. Layson, 771 N. Walnut, Waukegan, Ill. 60085

[21] Appl. No.: 09/184,574

[22] Filed: Nov. 2, 1998

[51] Int. Cl.⁶ .................................................. A01K 97/00
[52] U.S. Cl. ........................................... 43/2; 43/4
[58] Field of Search ........................... 43/2, 4, 4.5

[56] References Cited

U.S. PATENT DOCUMENTS

| | | | |
|---|---|---|---|
| 218,737 | 8/1879 | Henderson | 43/65 |
| 247,179 | 9/1881 | Duvall | 43/100 |
| 636,381 | 11/1899 | Hamel | 43/55 |
| 636,694 | 11/1899 | Pflueger | 43/41 |
| 1,444,367 | 2/1923 | Collamer | 43/56 |
| 1,876,692 | 9/1932 | Kornsweet | 43/102 |
| 2,853,828 | 9/1958 | Fisher | 43/56 |
| 2,864,195 | 12/1958 | Bachmann | 43/4 |
| 2,933,847 | 4/1960 | Frasure | 43/42.74 |
| 3,023,533 | 3/1962 | Bertram | 43/41 |
| 3,079,721 | 3/1963 | Smith | 43/17.5 |
| 3,124,892 | 3/1964 | O'Brien | 43/42 |
| 3,177,604 | 4/1965 | Ewing | 43/17.5 |
| 3,186,120 | 6/1965 | Layson | 43/2 |
| 3,271,897 | 9/1966 | Gelinas | 446/153 |
| 3,574,966 | 4/1971 | Sullivan | 43/8 |
| 3,753,309 | 8/1973 | Bryant | 43/17.5 |
| 4,020,580 | 5/1977 | Chappell et al. | 43/17.5 |
| 4,471,552 | 9/1984 | McIntosh et al. | 43/4 |
| 4,475,301 | 10/1984 | Wortham | 43/17.5 |
| 4,550,518 | 11/1985 | Layson | 43/2 |
| 4,672,764 | 6/1987 | Dempsey | 43/4 |
| 4,757,631 | 7/1988 | Anson-Smith | 43/17.5 |
| 4,862,626 | 9/1989 | Hamaguchi | 43/4.5 |
| 4,903,429 | 2/1990 | Tetenes | 43/44.99 |
| 4,916,845 | 4/1990 | Aydelette, Sr. | 43/4 |
| 5,005,309 | 4/1991 | Hall | 43/4 |
| 5,133,145 | 7/1992 | McDonald | 43/17.5 |
| 5,651,209 | 7/1997 | Rainey | 43/17.5 |

*Primary Examiner*—Michael J. Carone
*Assistant Examiner*—Darren W. Ark

[57] ABSTRACT

A fish decoy for fishing in a body of water comprising a sheet of flexible material having a top peripheral edge, a bottom peripheral edge, and two side peripheral edges, the sheet having a plurality of images of a preselected species of fish printed thereon. An elongated horizontally oriented float is affixed to the top edge of the flexible sheet, a weight is attached to the bottom peripheral edge of the sheet, with the float and weight cooperating to position the sheet in a substantially vertical orientation at a depth in the body of water appropriate for the preselected species of fish. The decoy also comprises a transparent hollow substantially neutrally buoyant cylinder attached to one peripheral edge of the sheet, the cylinder having a left portion and a right portion. The left portion has a permanently affixed solid left end wall, the right portion has either perforations or holes in the cylindrical right portion side wall or the right end wall, the right end wall being removably replaceable. Water and bait fish for the selected species of fish are poured into the hollow cylinder while the right end wall is removed and the hollow cylinder is vertically oriented above the body of water, the right end wall is replaced on the hollow cylinder, and the decoy, including the cylinder, is located in the body of water at the appropriate depth.

10 Claims, 1 Drawing Sheet

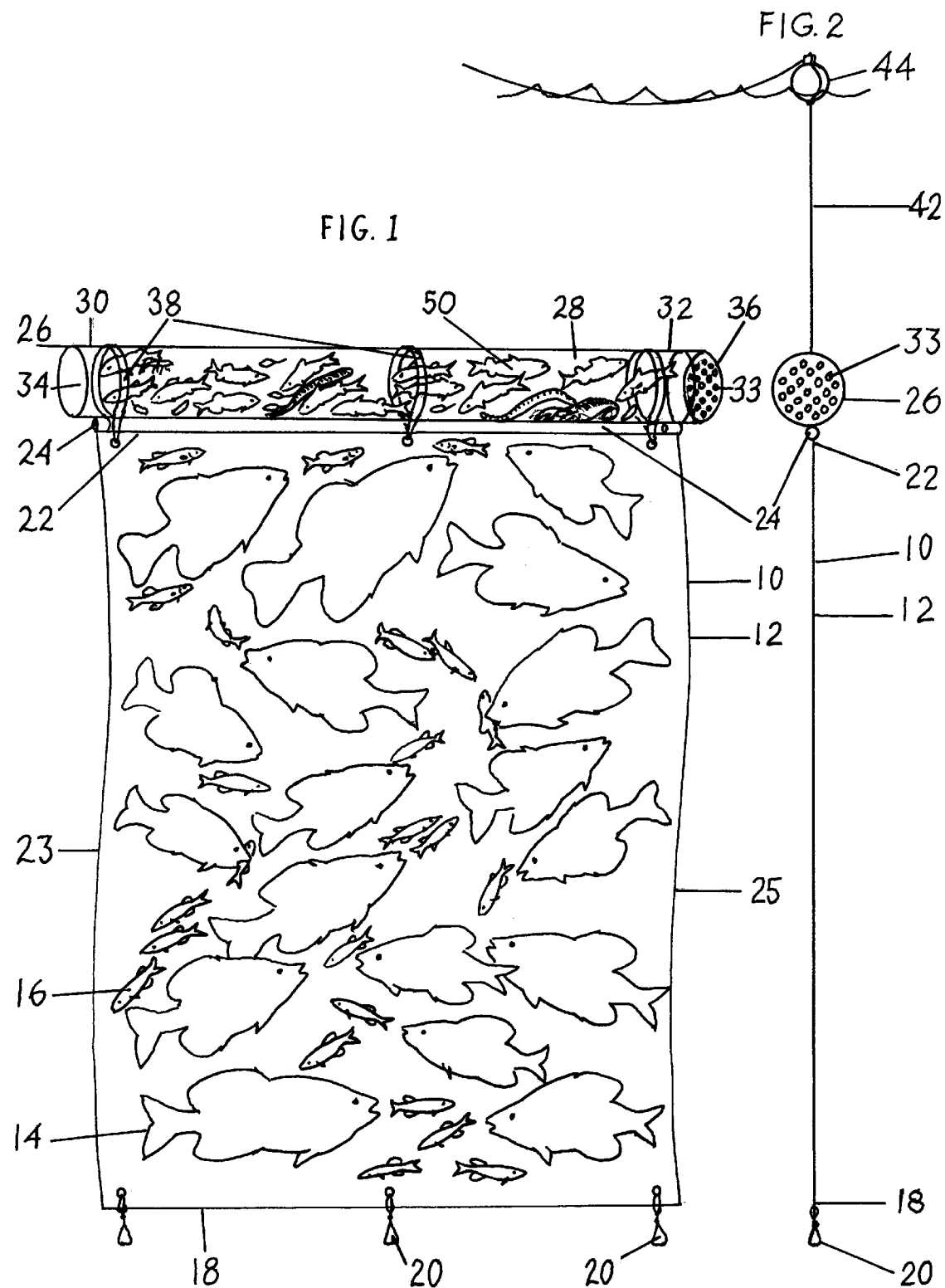

FISH DECOY

FIELD OF THE INVENTION

The invention relates generally to a fish decoy used to attract fish to an area of a body of water, generally an area where fishermen have baited hooks or lures for catching the fish.

BACKGROUND OF THE INVENTION

In prior art are devices in which fish-like images are printed on a transparent sheet and submerged in the water for the purposes of attracting fish, such as in my earlier U.S. Pat. No. 3,186,120. In order to give the fish images a three dimensional form, another prior art device, shown in my U.S. Pat. No. 4,550,518, discloses independent means of inflation to give fish images a three dimensional form.

However, none of the prior art devices has disclosed the combination of a transparent sheet with fish images printed thereon hanging below a cylindrical tube in which live bait fish, grubs, wigglers or crayfish can be placed and maintained in an active state for an extended period of time.

SUMMARY AND OBJECTS OF THE INVENTION

The invention provides a fish decoy for fishing in a body of water comprising a sheet of flexible material having a top peripheral edge, a bottom peripheral edge and two-side peripheral edges, the sheet having a plurality of images of a preselected species of fish printed thereon. An elongated horizontally oriented flotation means is affixed to the top edge of the flexible sheet, a weight means is attached to the bottom edge of the flexible sheet, with the flotation means and the weight means cooperating to position the sheet in a substantially vertical orientation at a depth in the body of water appropriate for the selected species of fish. The invention also comprises a transparent hollow substantially neutrally buoyant cylinder attached to one peripheral edge of the sheet, the cylinder having a left portion and a right portion. The left portion has a permanently affixed solid left end wall, the right portion has ventilation means in the cylindrical right portion side wall or the right end wall, the right end wall being removably replaceable. Water and bait fish for the selected species of fish is poured into the hollow cylinder while the right end wall is removed and the hollow cylinder is vertically oriented above the body of water, the right end wall is replaced on the hollow cylinder, and the decoy, including the cylinder, is located in the body of water at the appropriate depth.

In one embodiment, the hollow cylinder is removably attached to the flotation means, the sheet and weight means so that the flotation means, sheet and weight means can be rolled up and stored in the hollow cylinder when not in use.

In one embodiment of the decoy, the cylinder is removably attached to the flotation means by straps encircling the hollow cylinder and flotation means and passing through apertures near the top edge of the sheet. In one preferred embodiment, the straps are substantially transparent.

In another preferred embodiment, the decoy also comprises a retrieving line having two ends with one end attached to one of the cylinder, flotation means and sheet, and a locating buoy attached to the other end. In another preferred embodiment, the transparent sheet also has images of seaweed printed thereon.

The invention also provides a fish decoy for fishing in a body of water comprising a sheet of transparent material having a top peripheral edge, a bottom peripheral edge and two side peripheral edges. The sheet has a plurality of images of a preselected species of fish printed thereon. A weight means is attached to the bottom edge of the flexible sheet. A transparent rigid hollow cylinder is attached to the top edge of the sheet and has a left portion and a right portion, each of the portions has an end wall with the left portion having a permanently affixed solid left end wall and the right portion having ventilation means comprising a plurality of apertures in the cylinder right portion side walls or the right end wall, the right end wall also being removably replaceable. The decoy also comprises a flotation means affixed to one of the top edge of the flexible sheet or the rigid cylinder and a retrieving line attached to one of the sheet, the rigid cylinder or the flotation means. By this construction, water and bait fish for the selected species of fish is poured into the hollow cylinder while the right end wall is removed and the hollow cylinder is vertically oriented above the body of water, the right end wall is replaced on the hollow cylinder, the decoy, including the cylinder is lowered into the body of water by the retrieving line and the flotation and the weight means cooperate to position the sheet in a substantially vertical orientation at a depth appropriate for the preselected species of fish.

It is an object of the invention to provide a fish decoy having both inanimate, but life-like, fish images on the decoy as well as live bait trapped in the live bait tube attached to one side of the decoy. It is a further object to provide these in a setting which is very life-like.

It is another object of the invention to provide a fish decoy having a transparent sheet of printed life-like fish images that can be rolled up and stored in a hollow cylindrical tube which also doubles as a container for containing live bait fish immediately above the sheet of fish images when the decoy is positioned in a body of water.

BRIEF DESCRIPTION OF THE DRAWINGS

Other objects and advantages of the invention will become apparent upon reading the attached detailed description and upon reference to the drawing in which:

FIG. 1 is an elevation view of the invention showing a plurality of fish images appearing on transparent sheets and a plurality of live fish in a hollow cylindrical tube; and FIG. 2 is an end view showing the ventilated cap of the hollow cylindrical tube and the sheet.

While the invention is described in connection with certain preferred embodiments, it will be understood that the description is not intended to be limited to the embodiments shown but, on the contrary to cover the various alternative forms on the invention included within the spirit and scope of the impending claims.

DETAILED DESCRIPTION OF THE INVENTION

Illustrated in the drawings is an improved fish decoy 10 for attracting fish to a baited hook or lure (not shown) in a body of water. The decoy comprises a large substantially clear sheet 12 of flexible material. The sheet 12 is preferably made of Mylar or other clear plastic and may be approximately 40 inches long and 30 inches wide. Upon the sheet are painted or printed images of fish. Preferably, the images are of fish 14 that are desired to be caught by a fisherman that is using the decoy. Optionally, the sheet may also contain images of other game and fish that may be found naturally in the vicinity of these fish, or bait fish 16 that the desired species may feed upon. Seaweed or other natural flora may also be printed on the sheet.

Since the sheet preferably is clear, the fish will be able to be seen from both sides. Optionally, a translucent or opaque sheet may be used with fish images 14 or 16 printed on both sides. The sheet has a top peripheral edge 22, a bottom peripheral edge 18 and two side peripheral edge 23 and 25. Along the bottom peripheral edge 18 of the sheet 12 is a series of weights 20. In a preferred embodiment, the weights are bell shaped sinkers. In other embodiments, the weight could comprise a solid cylindrical metal mass attached to the bottom 18 of the sheet, or sand or rocks filling a cylindrical tube along the bottom edge 18 of the sheet.

Along the top peripheral edge 22 of the sheet is attached a float 24. In a preferred embodiment, the float comprises a hollow horizontal cylinder filled with air and having permanently affixed end walls or a cylindrical light weight foam. The float 24 and the weight 20 cooperate to position the decoy at the proper level in the body of water so that the fish images or seaweed on the sheet appear in a natural setting.

In one embodiment, connected to one peripheral edge of the sheet, atop the float 24 is a live bait container 26. In a preferred embodiment, the live bait container 26 comprises a clear hollow cylinder 28 made of rigid plastic such as styrene or ABS, which is substantially neutrally buoyant. The bait container 26 has a left side portion 30 and a right side portion 32. Permanently affixed to the end of the left side 30 is a solid end wall 34. Removably affixed to the end of the right side 32 is a perforated 33 or ventilated end wall 36. The side wall of the left portion 30 is solid, while the side wall of the right portion 32 may optionally be perforated 33 or at least have a few holes for ventilation or enhanced water flow as to be described later.

The right end wall 36 may be hinged to the right side, or it may be otherwise removably attachable, as by screwing onto the end, friction fit, or snap fit. In a preferred embodiment, the live bait container 26 is slightly longer than the sheet 12, is wide so that the sheet 12, the float 24 and the weights 26 can be rolled up and stored in the bait container 26 when not in use, as will be further explained later.

The bait container 26 is connected to one peripheral edge of the sheet preferably by a series of straps 38, which pass around the cylinder and through apertures 40 in the sheet 12 near its periphery, as for example, its top periphery 22. The straps are preferably made with a tang that fits in a groove and is then twisted when installed. The straps are preferably clear so as not to disrupt the line of sight of the fish in the body of water into the bait container. Optionally the straps may be made of cable ties, or elastic type straps with a snap connector.

In operation, the decoy 10 is spread out above the body of water. The bait container 26 is positioned substantially vertically with the left portion 30 down. If in a boat or on a dock in the body of water, the left portion 30 can be partially submerged in the body of water at this point. Water and real live bait fish 50 such as minnows, grubs, wigglers or crayfish can be poured into the bait container and the right end cap 36 is replaced on the right end of the bait container. The bait container 26 is then turned horizontally and submerged in the body of water.

The decoy 10 is then lowered further into the water and the decoy is positioned with the bait container 26 along one edge of the sheet 12. A retrieving line 42 also having a float 44 is preferably connected to one of the eyelets at the top of the sheet for retrieving the decoy when the fisherman has caught his catch. Optionally, the retrieving line could be attached to the bait container 26 or the float 24. The bait fish 50 can be kept live for an extended period of time due to the ventilating means or perforations 33 in the bait container allowing fresh water into the container.

In a optional embodiment, the float 24, sheet 12 and weight 20 are easily removable from the bait cylinder by unsnapping or twisting the tangs of the straps 38 and pulling them through the apertures at the top of the sheet 12. The sheet 12, float 24 and weight 20 can then be rolled up and placed inside the bait container 26 after it has been drained of water and bait fish by removing and replacing the end cap 36 so they can be stored in the cylinder when not in use.

In a preferred embodiment, the bait container 26 is attached to the top peripheral edge 22 of the sheet and the float 24. However, it can be appreciated that if the bait container 26 is substantially neutrally buoyant, it could be attached to either side 23 or 25 or bottom 18 peripheral edge of the sheet 12.

In another embodiment, if the bait container 26 is made of a plastic that is heavier than water it may be substituted for the weight means 29 and attached to the bottom peripheral edge 18 of the sheet 12. In an even further embodiment, if the bait container 26 is made of a plastic that is lighter than water, the float 24 can be eliminated, and the bait container 26 serve as to both hold the live bait and act as a flotation means 24 to position the decoy vertically at the proper depth in the body of water.

Having described one embodiment, the invention is now further defined by the appended claims.

I claim:

1. A fish decoy for fishing in a body of water comprising a sheet of flexible material having a top peripheral edge, a bottom peripheral edge, and two side peripheral edges, said sheet having a plurality of images of a preselected species of fish printed thereon, an elongated horizontally oriented flotation means affixed to the top peripheral edge of said flexible sheet, weight means attached to the bottom edge of said flexible sheet, said flotation means and said weight means cooperating to position said sheet in a substantially vertical orientation at a depth in the body of water appropriate for said preselected species of fish, and, a transparent hollow substantially neutrally buoyant live bait holding cylinder attached to one of said peripheral edges of said sheet, said cylinder having a left portion and a right portion, each of said portions having side walls and end walls, said left portion end wall being solid and permanently affixed, said right portion having ventilation means in the cylindrical right portion side wall or said right end wall, said right end wall being removably replaceable, whereby water and live bait fish for said preselected species of fish is poured into said hollow cylinder while said right end wall is removed and said hollow cylinder is vertically oriented above the body of water, said right end wall is replaced on said hollow cylinder, and said decoy, including said cylinder, is lowered into the body of water to the appropriate depth.

2. The decoy of claim 1 wherein said hollow cylinder is removably attached to said flotation means, sheet and weight means, whereby said flotation means, sheet and weight means are rolled up and stored in said hollow cylinder when not in use.

3. The decoy of claim 2 wherein said hollow cylinder is removably attached to said flotation means by straps encircling said hollow cylinder and flotation means and passing through apertures near the top peripheral edge of said sheet.

4. The decoy of claim 3 wherein said straps are substantially transparent.

5. The decoy of claim 2 wherein the length of said hollow cylinder is longer than the width of said sheet and said flotation means whereby said sheet and flotation means fit entirely within said hollow cylinder when not in use.

6. The decoy of claim I also comprising a retrieving line having two ends with one end attached to one of said cylinder, flotation means and sheet and a locating buoy attached to the other end.

7. The decoy of claim I wherein said sheet is transparent and also has images of seaweed printed thereon.

8. The decoy of claim I wherein said flotation means comprises a cylindrical tube with permanently affixed plugs at both ends.

9. A fish decoy for fishing in a body of water comprising a sheet of flexible material having a top peripheral edge, a bottom peripheral edge, and two side peripheral edges, said sheet having a plurality of images of a preselected species of fish printed thereon, weight means attached to the bottom edge of the flexible sheet, a transparent rigid live bait holding hollow cylinder attached to said top peripheral edge of said sheet, said cylinder having a left portion and a right portion, with each of said portions having a side wall, said left portion having a permanently affixed solid left end wall, said right portion having a right end wall and ventilation means comprising a plurality of apertures in the cylindrical right portion side wall or said right end wall, said right end wall being removably replaceable on the cylinder, flotation means affixed to one of said top edge of said flexible sheet or said cylinder, and a retrieving line attached to one of said sheet, rigid cylinder and flotation means, whereby water and bait fish for said preselected species of fish is poured into said hollow cylinder while said right end wall is removed and said hollow cylinder is vertically oriented above the body of water, said right end wall is replaced on said hollow cylinder, said decoy, including said cylinder, is lowered into said body of water by said retrieving line and said flotation means and said weight means cooperate to position said sheet in a substantially vertical orientation at a depth appropriate for said preselected species of fish.

10. The decoy of claim 9 wherein said sheet is substantially transparent and said images of said fish are life-like.

* * * * *